US009689761B2

(12) United States Patent
Matsui et al.

(10) Patent No.: US 9,689,761 B2
(45) Date of Patent: Jun. 27, 2017

(54) TORQUE SENSOR AND ELECTRIC POWER STEERING SYSTEM

(71) Applicant: JTEKT CORPORATION, Osaka-shi, Osaka (JP)

(72) Inventors: Yusuke Matsui, Shiki-gun (JP); Kensaku Hotta, Kashihara (JP)

(73) Assignee: JTEKT CORPORATION, Osaka (JP)

(*) Notice: Subject to any disclaimer, the term of this patent is extended or adjusted under 35 U.S.C. 154(b) by 121 days.

(21) Appl. No.: 14/697,976

(22) Filed: Apr. 28, 2015

(65) Prior Publication Data

US 2015/0330849 A1 Nov. 19, 2015

(30) Foreign Application Priority Data

May 19, 2014 (JP) ................................ 2014-103580

(51) Int. Cl.

| | |
|---|---|
| ***G01L 3/00*** | (2006.01) |
| ***G01L 3/10*** | (2006.01) |
| ***G01L 5/22*** | (2006.01) |
| ***G01D 5/14*** | (2006.01) |

(52) U.S. Cl.

CPC .............. *G01L 3/101* (2013.01); *G01D 5/145* (2013.01); *G01L 3/104* (2013.01); *G01L 5/221* (2013.01)

(58) Field of Classification Search

CPC .......... G01L 3/101; G01L 5/221; G01D 5/145

USPC .................................................... 73/862.331

See application file for complete search history.

(56) References Cited

U.S. PATENT DOCUMENTS

2007/0295109 A1* 12/2007 Tokumoto et al. ................ B29C 45/14065 73/862.331
2008/0258715 A1 10/2008 Reichert
2010/0242627 A1 9/2010 Okuyama et al.
2012/0060628 A1* 3/2012 Sanada et al. ........... B62D 6/10 73/862.335

(Continued)

FOREIGN PATENT DOCUMENTS

EP 1 990 253 A1 11/2008
EP 2 314 499 A1 4/2011

(Continued)

OTHER PUBLICATIONS

KR20150034982A, English Translation, Date: Apr. 2015, Publisher: Korean Intellectual Property Office, 16 pages.*

(Continued)

*Primary Examiner* — Lisa Caputo
*Assistant Examiner* — Roger Hernandez-Prewitt
(74) *Attorney, Agent, or Firm* — Oliff PLC

(57) ABSTRACT

A torque sensor includes a first magnet fixed to a first shaft, a tubular magnetic yoke assembly in which a magnetic yoke core is molded with a resin member, and a first magnetic sensor that detects a magnetic flux from the first magnet induced by the magnetic yoke core. The torque sensor also includes a collar made of a ferromagnetic body that is fixed to an inner circumference of the magnetic yoke assembly and to which a second shaft is press-fitted and fixed, and a second magnet for an index sensor that is disposed on an outer circumference of the magnetic yoke assembly. At least a part of the collar is disposed between the magnetic yoke core and the second magnet with respect to an axial direction of the magnetic yoke assembly.

5 Claims, 5 Drawing Sheets

(56) References Cited

U.S. PATENT DOCUMENTS

2012/0074808 A1* 3/2012 McDonald et al. ... G01D 5/145 310/254.1
2012/0223703 A1* 9/2012 Ludwig .................. G01D 5/145 324/207.25
2013/0221957 A1* 8/2013 Ludwig .................... G01B 7/30 324/207.25
2013/0263654 A1 10/2013 Pietron et al.
2014/0076656 A1 3/2014 Tanaka et al.

FOREIGN PATENT DOCUMENTS

JP 2004-061386 A 2/2004
JP 2010-237082 A 10/2010
KR 20150034982 A * 4/2015 ............. G01L 3/104
WO 2007/003468 A1 1/2007
WO WO 2012016863 A1 * 2/2012 ........... G01D 5/2451

OTHER PUBLICATIONS

WO2012016863A1, English Translation of Bibliography and Description, Date: Feb. 2012, Publisher: EPO, 8 pages.*
Oct. 2, 2015 Extended Search Report issued in European Patent Application No. 15165784.8. , pages total: 9.
Nov. 4, 2016 Office Action issued in European Patent Application No. 15165784.8, 8 pages.

* cited by examiner

TORQUE SENSOR AND ELECTRIC POWER STEERING SYSTEM

INCORPORATION BY REFERENCE

The disclosure of Japanese Patent Application No. 2014-103580 filed on May 19, 2014 including the specification, drawings and abstract, is incorporated herein by reference in its entirety.

BACKGROUND OF THE INVENTION

1. Field of the Invention

The invention relates to a torque sensor and an electric power steering system.

2. Description of Related Art

Japanese Patent Application Publication No. 2010-237082 (JP 2010-237082 A) proposes a technique of disposing a torque sensor and an index sensor coaxially with a steering shaft in an electric power steering system. The torque sensor is disposed on the steering shaft that couples a steering operation member and a steering mechanism. The index sensor detects the number of rotation of the steering shaft that rotates multiple times. The torque sensor has a first magnetic sensor disposed beside a first magnet unit. The index sensor has a second magnetic sensor disposed beside a second magnet.

In JP 2010-237082 A, a plate member formed of a magnetic body is provided between the first magnetic sensor and the second magnet. The plate member reduces a magnetic flux radiated from the second magnet toward the first magnetic sensor. Therefore, the magnetic interference of the index sensor with the torque sensor is reduced, and the detection accuracy of the torque sensor can be enhanced. However, the plate member and a structure that supports the plate member are required, and thus the number of components and the number of assembly steps increase and the manufacturing cost increases.

SUMMARY OF THE INVENTION

It is an object of the present invention to provide an inexpensive torque sensor that is capable of suppressing magnetic interference of a magnet for an index sensor and that can enhance detection accuracy of the torque sensor, and an electric power steering system equipped with the torque sensor.

According to an aspect of the present invention, a torque sensor that detects torque based on a torsion displacement between a first shaft and a second shaft coaxially coupled via a torsion bar includes: a cylindrical first magnet fixed to the first shaft; a tubular magnetic yoke assembly that includes a magnetic yoke core and a resin member with which the magnetic yoke core is molded, and surrounds the first magnet; a magnetic sensor that detects a magnetic flux from the first magnet induced by the magnetic yoke core; a collar made of a ferromagnetic body fixed to an inner circumference of the magnetic yoke assembly, and to which the second shaft is press-fitted and fixed; and a second magnet for an index sensor that is disposed on an outer circumference of the magnetic yoke assembly. In the torque sensor, at least a part of the collar is disposed between the magnetic yoke core and the second magnet with respect to an axial direction of the magnetic yoke assembly.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
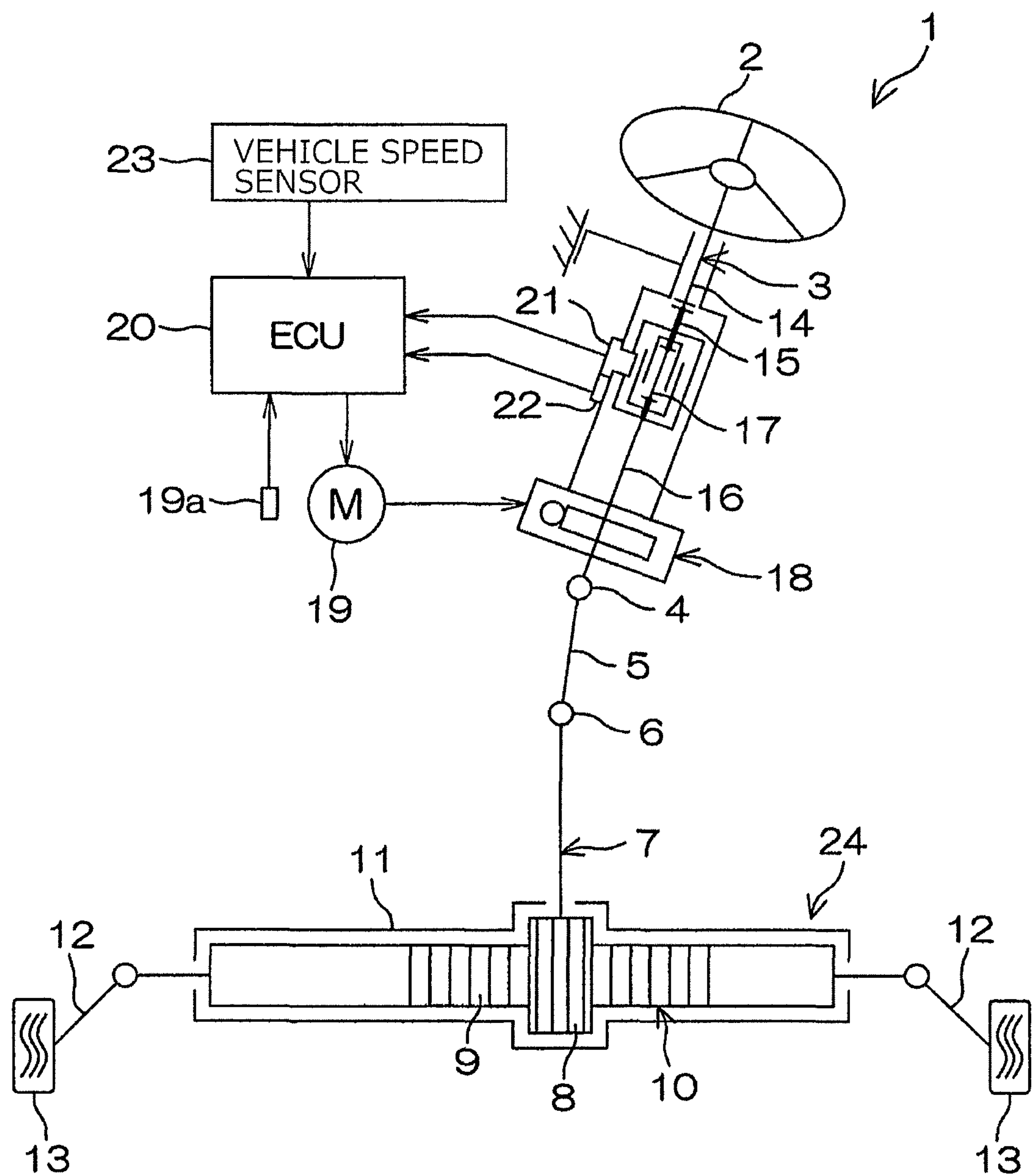
FIG. 1 is a schematic view showing a schematic configuration of an electric power steering system including a torque sensor according to a first embodiment of the present invention.

A preferred embodiment of the present invention will now be described with reference to the accompanying drawings. The present embodiment will be described using an example in which a torque sensor is applied to an electric power steering system of an automobile. The torque sensor of the present invention can also be applied to other devices and equipment other than the electric power steering system. FIG. 1 is a schematic view showing a schematic configuration of the electric power steering system including a torque sensor of a first embodiment of the present invention.

As shown in FIG. 1, an electric power steering system 1 includes a steering shaft 3 and an intermediate shaft 5. The steering shaft 3 is coupled to a steering operation member 2 such as a steering wheel. The intermediate shaft 5 is coupled to the steering shaft 3 via a universal joint 4. The electric power steering system 1 also includes a pinion shaft 7 and a rack shaft 10. The pinion shaft 7 is coupled to the intermediate shaft 5 via a universal joint 6. The rack shaft 10 forms a rack 9 that meshes with a pinion 8 provided at a distal end portion of the pinion shaft 7, and extends in the lateral direction of the vehicle.

The rack shaft 10 is supported by a tubular housing 11 so as to be axially movable. A tie rod 12 is coupled to each end of the rack shaft 10. The tie rods 12 are coupled to respective turning wheels 13 via respective knuckle arms (not shown). When the steering operation member 2 is operated and the steering shaft 3 is rotated, the rotation is transmitted to the pinion 8 via the intermediate shaft 5, and the like, and converted to a linear motion of the rack shaft 10 extending along the lateral direction of the vehicle by the pinion 8 and the rack 9. The turning wheels 13 are thus turned.

The steering shaft 3 includes a first shaft 15, a second shaft 16, and a torsion bar 17. The first shaft 15 is an input shaft connected to the steering operation member 2 via a coupling shaft 14. The second shaft 16 is an output shaft connected to the universal joint 4. The torsion bar 17 coaxially couples the first shaft 15 and the second shaft 16. The first shaft 15 and the second shaft 16 can transmit torque to each other via the torsion bar 17, and are relatively rotatable within a predetermined range.

The electric power steering system 1 includes an electric motor 19 and an electronic control unit (ECU) 20 in the second shaft 16 of the steering shaft 3. The electric motor 19 is provided for steering operation assistance to transmit power via a speed-reducing mechanism 18 such as a worm gear mechanism. The ECU 20 includes a microcomputer. The electric motor 19 is constituted of, for example, a brushless motor. The electric motor 19 includes a rotation angle sensor 19*a* that detects a rotation angle of a motor rotor.

The electric power steering system 1 includes a torque sensor 21, an index sensor 22, and a vehicle speed sensor 23. The torque sensor 21 detects a steering operation torque applied to the steering operation member 2. The index sensor 22 is integrally provided with the torque sensor 21. The vehicle speed sensor 23 detects a vehicle speed. The torque sensor 21 detects a torque applied to the steering shaft 3 from the change in magnetic flux due to a relative rotational displacement of the first shaft 15 and the second shaft 16 caused by torsion of the torsion bar 17.

The ECU 20 has a function of controlling drive of the electric motor 19 for steering operation assistance based on the results of detection by the torque sensor 21 and the vehicle speed sensor 23. When the ECU 20 drives the electric motor 19 for steering operation assistance, the speed of output rotation (power) of the electric motor 19 is reduced by the speed-reducing mechanism 18 and the power is transmitted to the second shaft 16. The power transmitted to the second shaft 16 is further transmitted to a turning mechanism 24 including the pinion shaft 7, the rack shaft 10, the tie rods 12, the knuckle arms, and the like via the intermediate shaft 5, and the like The steering operation of the driver is thus assisted.

The index sensor 22 outputs a position detection signal to the ECU 20 when a phase of the multi-rotating steering operation member 2 (steering shaft 3) is at a reference position. The ECU 20 has a function of detecting the number of rotation of the steering operation member 2 based on the input of the position detection signal from the index sensor 22. The ECU 20 may have a function of detecting a steering operation angle of the multi-rotating steering operation member 2 as an absolute angle based on a rotation angle detection signal from the rotation angle sensor 19*a* provided in the electric motor 19 and the position detection signal from the index sensor 22.

Figure 2:
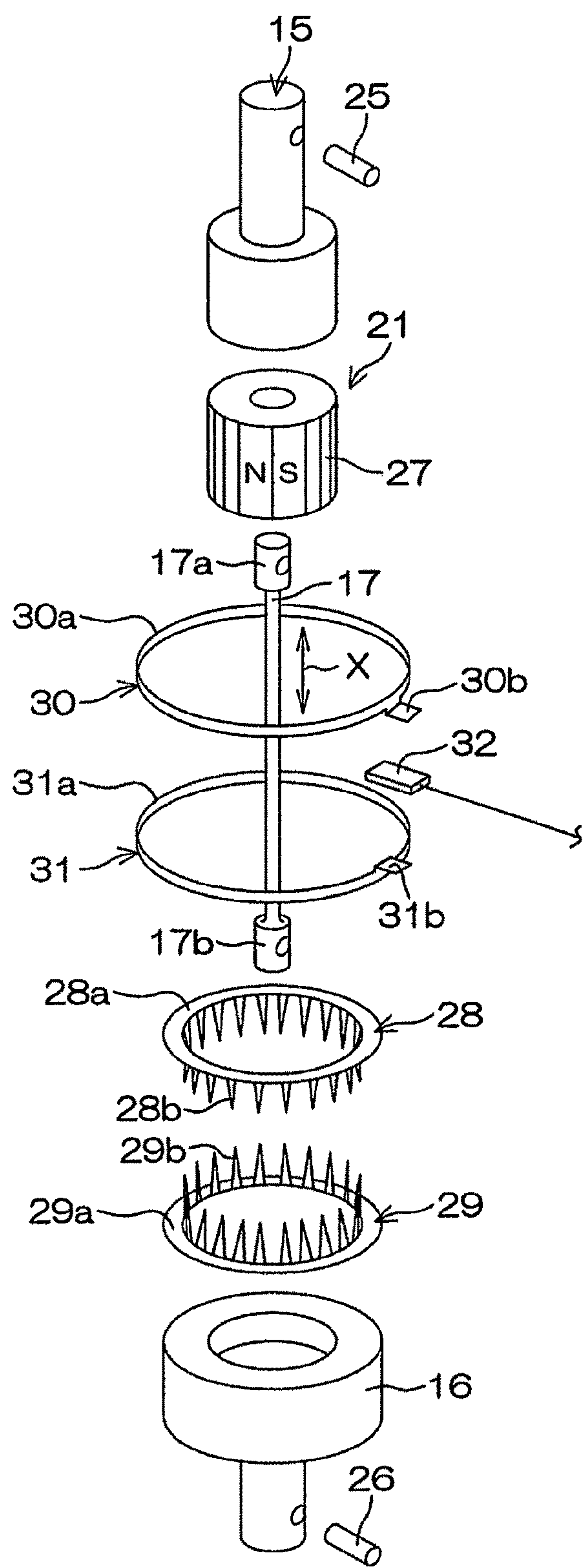
FIG. 2 is an exploded perspective view of the torque sensor of FIG. 1.
Figure 3:
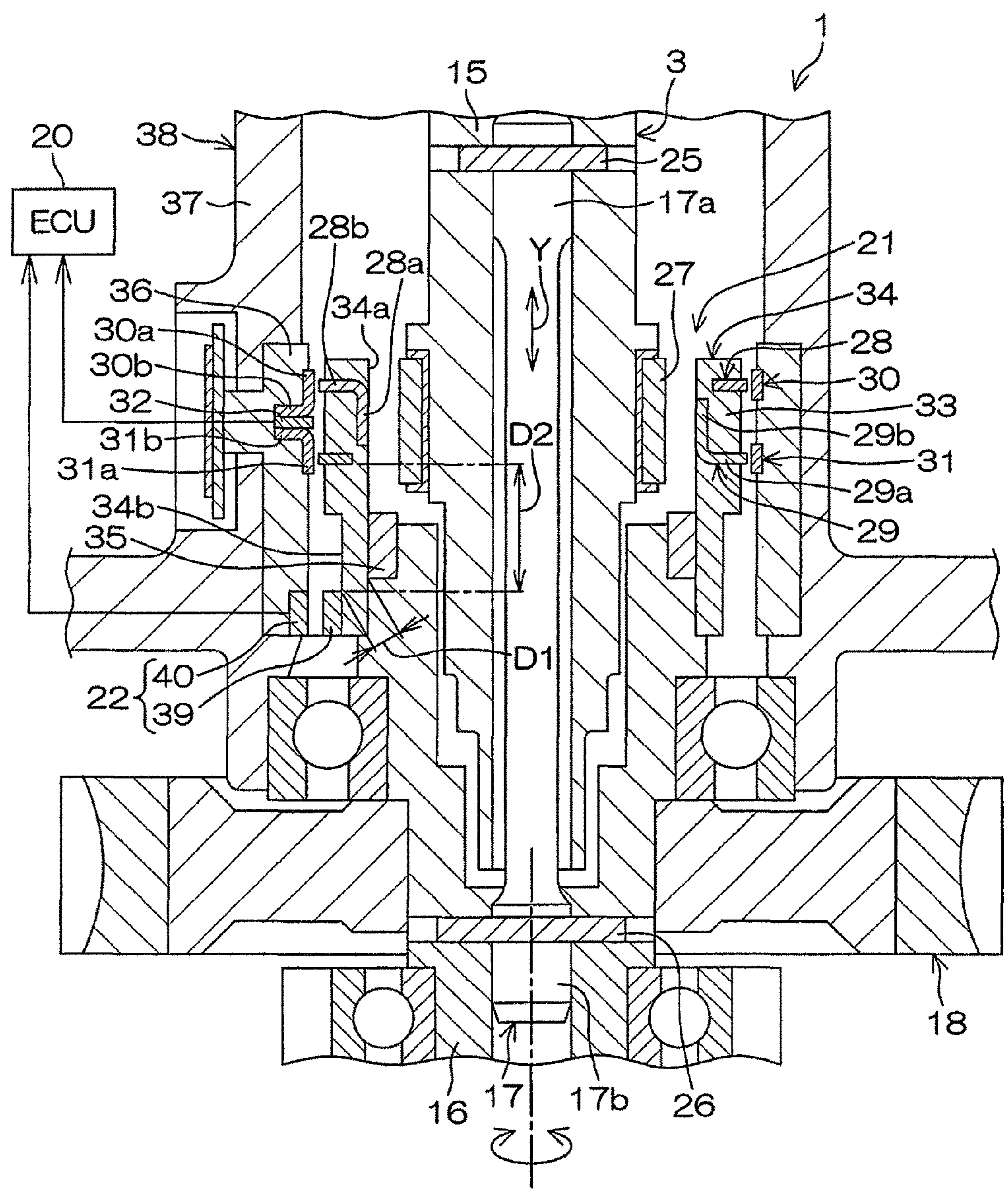
FIG. 3 is a cross-sectional view of a main part of the electric power steering system of FIG. 1, showing a torque sensor and a peripheral structure.

FIG. 2 is an exploded perspective view of the torque sensor 21. FIG. 3 is a cross-sectional view of a main part of the electric power steering system. As shown in FIGS. 2 and 3, one end 17*a* of the torsion bar 17 is coupled to the first shaft 15 with a pin 25. The other end 17*b* of the torsion bar 17 is coupled to the second shaft 16 with a pin 26. The torque sensor 21 includes a first magnet 27, a pair of magnetic yoke cores 28, 29, a pair of magnetic flux collecting rings 30, 31, and a first magnetic sensor 32. The first magnet 27 is a multipolar magnet provided for detecting torque. The magnetic yoke cores 28, 29 are made of soft magnetic body. The magnetic flux collecting rings 30, 31 induce the magnetic flux from the magnetic yoke cores 28, 29. The first magnetic sensor 32 is provided for detecting torque and constituted of a hall IC, for example.

The first magnet 27 is a multi-polar magnetizing ring-shaped magnet coupled to one end of the first shaft 15 so as to be rotate together with the first shaft 15, and the N poles and the S poles are alternately magnetized in the circumferential direction. An axis line of the first magnet 27 and an axis line of the first shaft 15 coincide with each other. The magnetic yoke cores 28, 29 disposed radially outward of the first magnet 27 are coupled to one end of the second shaft 16 so as to be relatively rotatable with respect to the first magnet 27. The magnetic yoke cores 28, 29 each include a yoke core ring 28*a*, 29*a*, and a plurality of claws 28*b*, 29*b*. The yoke core rings 28*a*, 29*a* are spaced from and face each other. The claws 28*b* and the claws 29*b* are disposed circumferentially in the yoke core ring 28*a* and the yoke core ring 29*a*, respectively.

Figure 4:
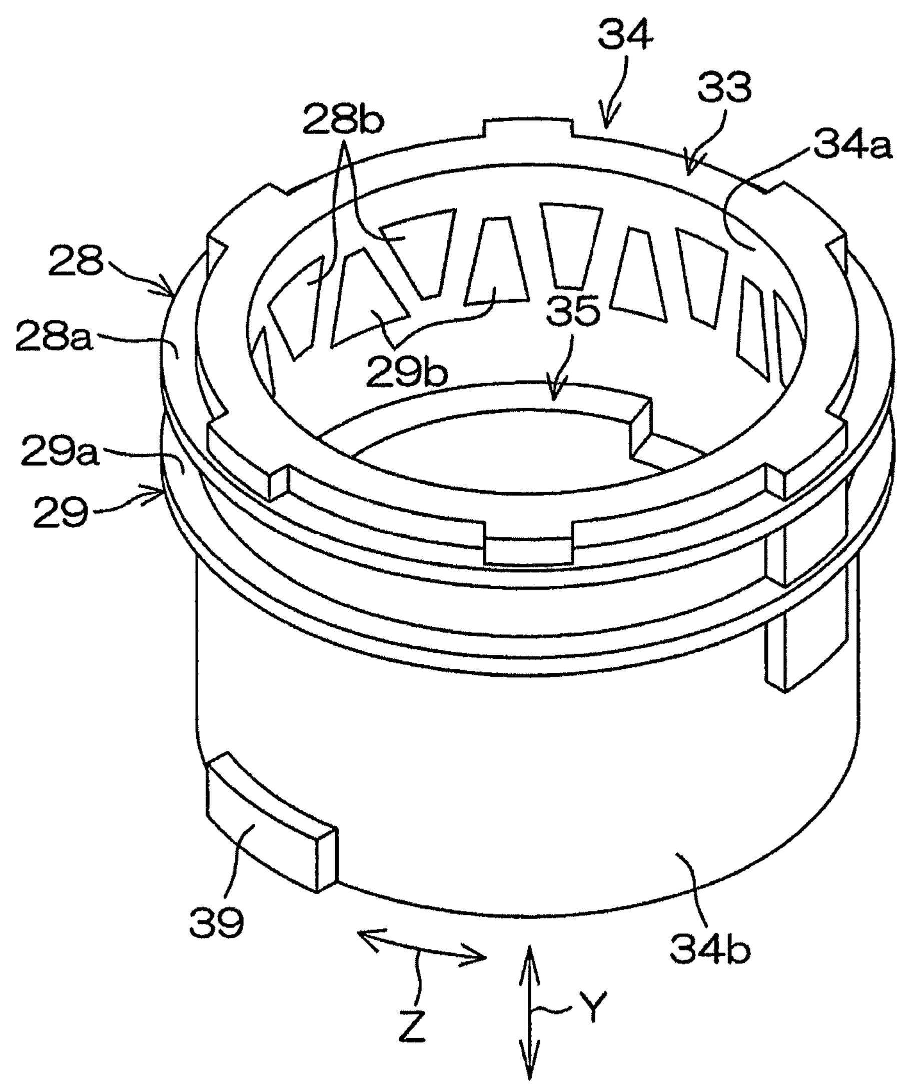
FIG. 4 is a schematic perspective view of a magnetic yoke assembly including magnetic yoke cores and a resin member molded with the magnetic yoke cores in the first embodiment.

As shown in FIG. 4, the magnetic yoke cores 28, 29 are molded with a tubular resin member 33 with the respective claws 28*b*, 29*b* facing each other so as to be shifted at appropriate intervals in the circumferential direction. The magnetic yoke cores 28, 29 are molded with the tubular resin member 33 to form a tubular magnetic yoke assembly 34. As shown in FIGS. 3 and 4, a cylindrical collar 35 made of a ferromagnetic body, to which one end of the second shaft 16 is press-fitted and fixed, is fixedly fitted to an inner circumference 34*a* of the magnetic yoke assembly 34 (corresponds to the inner circumference of the resin member 33). Iron, cobalt, nickel, or an alloy thereof can be used for the ferromagnetic body forming the collar 35. The collar 35 may be fixed by press-fitting or may be fixed with an adhesive to the magnetic yoke assembly. The collar 35 may be inserted to a die during the resin molding of the resin member 33 to be fixed to the resin member 33.

As shown in FIG. 3, the magnetic yoke assembly 34 holding the magnetic yoke cores 28, 29 is attached to the second shaft 16 via the collar 35. The magnetic yoke assembly 34 is configured such that a magnetic flux density between the yoke core rings 28*a*, 29*a* changes when the first magnet 27 and the magnetic yoke cores 28, 29 relatively rotate. As shown in FIG. 4, the claws 28*b*, 29*b* of the magnetic yoke cores 28, 29 that face the first magnet 27 are exposed from the inner circumference of the resin member 33. In a steering operation neutral state in which the torque is not applied to the first shaft 15 and the second shaft 16, the magnetic yoke cores 28, 29 are disposed such that the distal ends of the claws 28*b*, 29*b* point to the respective borders of the N poles and the S poles of the first magnet 27.

As shown in FIGS. 2 and 3, the magnetic flux collecting rings 30, 31 are annular members made of a soft magnetic body. The magnetic flux collecting rings 30, 31 are disposed radially outward of the magnetic yoke cores 28, 29 so as to be relatively rotatable with respect to the magnetic yoke cores 28, 29, respectively. The magnetic flux collecting rings 30, 31 are magnetically coupled to the magnetic yoke cores 28, 29, respectively.

Each of the magnetic flux collecting rings 30, 31 includes an annular main body 30*a*, 31*a*, and a flat plate shaped magnetic flux collecting plate 30*b*, 31*b*. The magnetic flux collecting plates 30*b*, 31*b* are extended radially outward from the main bodies 30*a*, 31*a*, respectively. In the magnetic flux collecting rings 30, 31, the magnetic flux collecting plates 30*b*, 31*b* are disposed so as to face and to be spaced from each other in an axial direction X of the first shaft 15. The first magnetic sensor 32 is inserted between the magnetic flux collecting plates 30*b*, 31*b*.

As shown in FIG. 3, the magnetic flux collecting rings 30, 31 and the first magnetic sensor 32 are molded in a tubular resin member 36. The resin member 36 is disposed so as to surround the resin member 33 of the magnetic yoke assembly 34. The resin member 36 is fixed to a tubular sensor housing 37. The sensor housing 37 forms a part of a tubular steering column 38 to which the steering shaft 3 is inserted and rotatably supported.

The first magnetic sensor 32 detects the density of the magnetic flux generated between the magnetic flux collecting plates 30*b*, 31*b*. The first magnetic sensor 32 is disposed to generate an output (potential difference) corresponding to a component parallel to the axial direction X of the magnetic flux generated between the magnetic flux collecting plates 30*b*, 31*b*. The ECU 20 is configured to calculate steering operation torque input to the steering shaft 3 based on a signal level of the output signal from the first magnetic sensor 32 (output voltage of the hall IC).

As shown in FIGS. 3 and 4, the index sensor 22 includes a second magnet 39 and a second magnetic sensor 40. The second magnet 39 is fixed to an outer circumference 34*b* of the magnetic yoke assembly 34 (corresponds to the outer circumference of the tubular resin member 33) with an adhesive, for example. The second magnetic sensor 40 is held by the tubular resin member 36 holding the magnetic flux collecting rings 30, 31 and the first magnetic sensor 32. The second magnet 39 is disposed at a predetermined position in a circumferential direction Z (see FIG. 4) of the magnetic yoke assembly 34 that rotates together with the second shaft 16. As shown in FIG. 3, the second magnetic sensor 40 is disposed at a predetermined position (reference position) in the circumferential direction of the resin member 36 fixed to the sensor housing 37.

The index sensor 22 outputs the position detection signal to the ECU 20 when the second magnet 39 faces the second magnetic sensor 40 at the reference position each time the second shaft 16 makes one rotation. At least a part of the collar 35 is disposed between the magnetic yoke cores 28, 29 and the second magnet 39 with respect to an axial direction Y of the magnetic yoke assembly 34. As shown in FIG. 3, the entire collar 35 may be disposed between the magnetic yoke cores 28, 29 and the second magnet 39 with respect to the axial direction Y of the magnetic yoke assembly 34. Although not illustrated, at least a part of the collar 35 may be disposed between the magnetic yoke cores 28, 29 and the second magnet 39 with respect to the axial direction Y of the magnetic yoke assembly 34.

A distance D1 between the second magnet 39 and the collar 35 is smaller than a distance D2 between the second magnet 39 and the magnetic yoke core 29 (the magnetic yoke core 29, which is closer to the second magnet 39, of the pair of magnetic yoke cores 28, 29) (D1 <D2). According to the present embodiment, the magnetic flux from the second magnet 39 for the index sensor 22 to the magnetic yoke cores 28, 29 of the torque sensor 21 is short-circuited by the collar 35 made of a ferromagnetic body. Therefore, the magnetic interference of the second magnet 39 with the magnetic yoke cores 28, 29 of the torque sensor 21 is suppressed. The detection accuracy of torque is thereby enhanced. Furthermore, the collar 35, usually provided to attach the magnetic yoke assembly 34 to the steering shaft 3 (second shaft 16), is also used as a member that suppresses the magnetic interference. Therefore, it is not necessary to provide an additional member that suppresses the magnetic interference, and such a simplified structure allows reducing the manufacturing cost.

The distance D1 between the second magnet 39 and the collar 35 is smaller than the distance D2 between the second magnet 39 and the magnetic yoke core 29 (the magnetic yoke core 29, which is closer to the second magnet 39, of the pair of magnetic yoke cores 28, 29) (D1<D2). Therefore, the magnetic interference of the second magnet 39 with the magnetic yoke cores 28, 29 can be reliably reduced. Furthermore, the second magnet 39 is fixed to the magnetic yoke assembly 34 (to the resin member 33 thereof). Therefore, the magnetic yoke assembly 34 and the second magnet 39 for the index sensor 22 can be handled as a one unit, so that the structure can be simplified.

Figure 5:
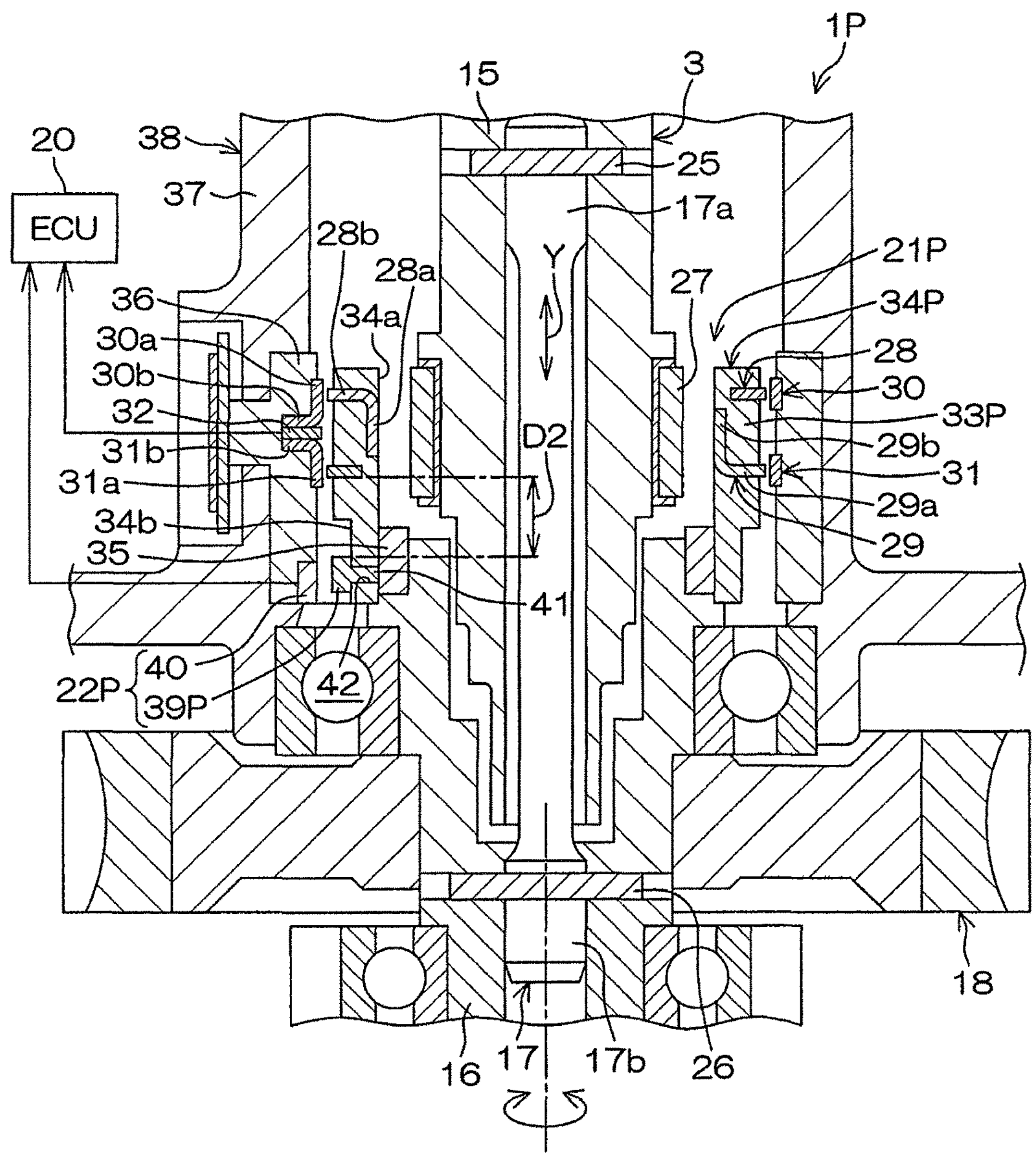
FIG. 5 is a cross-sectional view of a main part of an electric power steering system according to a second embodiment of the present invention, showing a torque sensor and a peripheral structure.

If the entire collar 35 is disposed between the magnetic yoke cores 28, 29 and the second magnet 39 with respect to the axial direction Y of the magnetic yoke assembly 34 as shown in FIG. 3, the entire region of the collar 35 can be used to suppress the magnetic interference. Thus, the magnetic interference can be more reliably reduced. FIG. 5 is a cross-sectional view of a main part of an electric power steering system 1P including a torque sensor 21P according to a second embodiment of the present invention.

The torque sensor 21P of the second embodiment shown in FIG. 5 mainly differs from the torque sensor 21 of the first embodiment shown in FIG. 3 in the points described below. In the second embodiment, a part of the collar 35 is disposed between a second magnet 39P for an index sensor 22P and the magnetic yoke cores 28, 29 with respect to the axial direction Y of a magnetic yoke assembly 34P. A projection 41 provided on the second magnet 39P is inserted to and fixed in an insertion hole 42 radially passing through a resin member 33P of the magnetic yoke assembly 34P. A distal end of the projection 41 of the second magnet 32P is in contact with or in the proximity of the outer circumference of the collar 35.

In the components of the second embodiment in FIG. 5, the same components as those of the component of the first embodiment in FIG. 3 are denoted by the same reference numerals as those of the component of the first embodiment in FIG. 3. According to the second embodiment, the magnetic flux from the second magnet 39P for the index sensor 22P to the magnetic yoke cores 28, 29 of the torque sensor 21P is short-circuited by the collar 35 made of ferromagnetic body. Therefore, operations and effects similar to the torque sensor of the first embodiment can be achieved.

Since the projection 41 of the second magnet 39P is inserted to and fixed in the insertion hole 42 of the resin member 33P of the magnetic yoke assembly 34P, the fixing is ensured. In the second embodiment, the insertion hole 42 may be a bottomed hole that does not pass through the resin member 33P. In the second embodiment, a mixture of a magnet grain or a fine powder of the magnet and the resin serving as a binder may be molded and solidified in the insertion hole 42 of the magnetic yoke assembly 34P to form the second magnet 39P including a bonded magnet. In this case, the second magnet can be formed and fixed to the magnetic yoke assembly at the same time, which is good for ease of assembly.

The present invention is not limited to the embodiments described above, and a magnetic resistance element (MR element) may be used in place of the hall IC for the magnetic sensors. Various modifications can be made without departing from the spirit and scope of the present invention.

What is claimed is:

1. A torque sensor that detects torque based on a torsion displacement between a first shaft and a second shaft coaxially coupled via a torsion bar, the torque sensor comprising:

a cylindrical first magnet fixed to the first shaft;

a tubular magnetic yoke assembly that includes a magnetic yoke core and a resin member with which the magnetic yoke core is molded, and surrounds the first magnet;

a magnetic sensor that detects a magnetic flux from the first magna induced by the magnetic yoke core;

a collar made of a ferromagnetic body that is fixed to an inner circumference of the magnetic yoke assembly, and to which the second shaft is press-fitted and fixed; and a second magnet for an index sensor that is disposed on an outer circumference of the magnetic yoke assembly; wherein at least a part of the collar is disposed between the magnetic yoke core and the second magnet with respect to an axial direction of the magnetic yoke assembly.

2. The torque sensor according to claim 1, wherein the entire collar is disposed between the magnetic yoke core and the second magnet with respect to the axial direction of the magnetic yoke assembly.

3. An electric power steering system comprising:

the torque sensor according to claim 2, wherein the torque sensor detects a torque applied to a steering operation member.

4. An electric power steering system comprising:

the torque sensor according to claim 1, wherein the torque sensor detects a torque applied to a steering operation member.

5. The torque sensor according to claim 1, wherein the inner circumference of the magnetic yoke assembly is an inward-facing surface that faces a center axis of the magnetic yoke assembly.

* * * * *